US010924808B2

(12) United States Patent
Qi (10) Patent No.: US 10,924,808 B2
(45) Date of Patent: Feb. 16, 2021

(54) AUTOMATIC SPEECH RECOGNITION FOR LIVE VIDEO COMMENTS

(71) Applicant: Facebook, Inc., Menlo Park, CA (US)

(72) Inventor: Peng Qi, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 45 days.

(21) Appl. No.: 15/856,866

(22) Filed: Dec. 28, 2017

(65) Prior Publication Data

US 2019/0206408 A1 Jul. 4, 2019

(51) Int. Cl.
| | |
|---|---|
| *H04N 21/4788* | (2011.01) |
| *H04N 21/422* | (2011.01) |
| *H04N 21/431* | (2011.01) |
| *G10L 15/22* | (2006.01) |
| *H04N 21/2187* | (2011.01) |
| *H04N 21/442* | (2011.01) |
| *G10L 15/26* | (2006.01) |

(52) U.S. Cl.
CPC ......... *H04N 21/4788* (2013.01); *G10L 15/22* (2013.01); *H04N 21/2187* (2013.01); *H04N 21/42203* (2013.01); *H04N 21/4316* (2013.01); *H04N 21/44218* (2013.01); *G10L 15/26* (2013.01); *G10L 2015/223* (2013.01)

(58) Field of Classification Search
CPC . G10L 15/265; G10L 15/22; G10L 2015/223; G10L 15/26; H04N 21/42203; H04N 21/4316; H04N 21/44218; H04N 21/4788; H04N 21/2187

See application file for complete search history.

(56) References Cited

U.S. PATENT DOCUMENTS

| | | | |
|---|---|---|---|
| 9,342,501 B2 * | 5/2016 | Beaumont | G06F 16/24575 |
| 2014/0114648 A1 * | 4/2014 | Eggink | G06F 17/274 704/9 |
| 2014/0173648 A1 * | 6/2014 | Ball | H04N 21/25 725/25 |
| 2015/0150031 A1 * | 5/2015 | Gibbon | H04H 60/45 725/12 |
| 2017/0214945 A1 * | 7/2017 | Chang | H04H 20/71 |
| 2019/0095535 A1 * | 3/2019 | Miller | G06F 16/24578 |

* cited by examiner

*Primary Examiner* — Michelle M Koeth
(74) *Attorney, Agent, or Firm* — Jordan IP Law, LLC (57) ABSTRACT

In one embodiment, a system includes a microphone, memory, and a processor. The processor is operable to access environmental sounds captured by the microphone while the user is watching a live video. The processor is further operable to determine, by analyzing the captured sounds, a response by the user to the live video and generate a comment or a reaction element based on the determined response by the user to the live video. The processor is further operable to post the generated comment or reaction element for display along with the live video.

20 Claims, 5 Drawing Sheets

AUTOMATIC SPEECH RECOGNITION FOR LIVE VIDEO COMMENTS

TECHNICAL FIELD

This disclosure generally relates to videos and more particularly to automatic speech recognition for live video comments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device-such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enhance a user's live video experience by providing automatic speech recognition (ASR) for posting comments to a live video. For example, a user may choose a particular live video in a newsfeed to view on their smartphone or other display device. While watching the live video, environmental sounds may be captured by the user's smartphone. In some embodiments, automatic speech recognition (ASR) may be used on the captured sounds to detect the user's speech. Spoken comments by the user about the live video may be automatically detected and used to generate one or more comments that are posted along with the live video. In some embodiments, the generated comments may float across the live video or may appear in a comment area of an interface in which the live video is playing. In some cases, the user may have the ability to approve, retract and/or edit comments before they are posted to the live video.

Some embodiments may utilize an ASR algorithm that utilizes signals from a variety of sources to accurately understand the user's comments. For example, the specific content of the live video being watched and other users' comments may be used to accurately understand and correct any recognized speech. Some embodiments may filter comments (e.g., find the most useful or relevant comments for a particular user) and/or cluster comments based on time periods. Some embodiments may detect emotions and reactions such as laughs and use them to determine a sentiment of the user watching the live video. The determined sentiment may then be used to post reactions that float across the live video (e.g., smiley face icon for a laugh) and/or to effect a visual aspect of any posted comment (e.g., size of font or color). In some embodiments, privacy features (e.g., control of which other users may see generated comments) and/or accessibility features (e.g., using a camera to detect sign language and then generate comments) may also be included.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
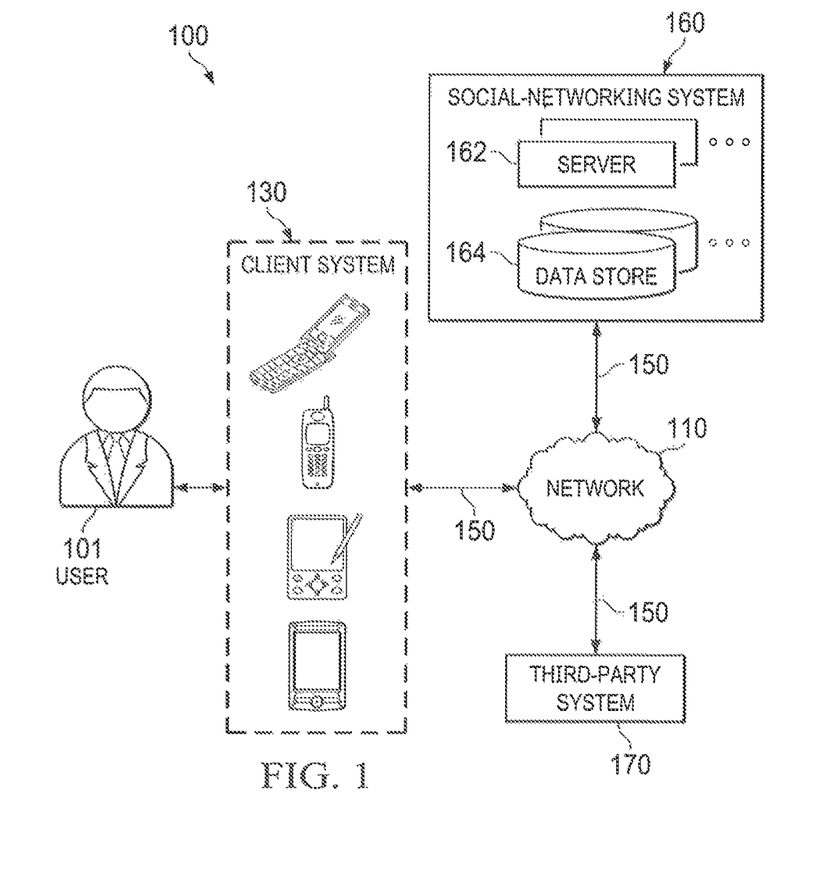
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client systems 130 to access, send data to, and receive data from social-networking system 160 or third-party system 170.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable user 101 to access network 110. A client system 130 may enable its user 101 to communicate with other users 101 at other client systems 130.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

Figure 2:
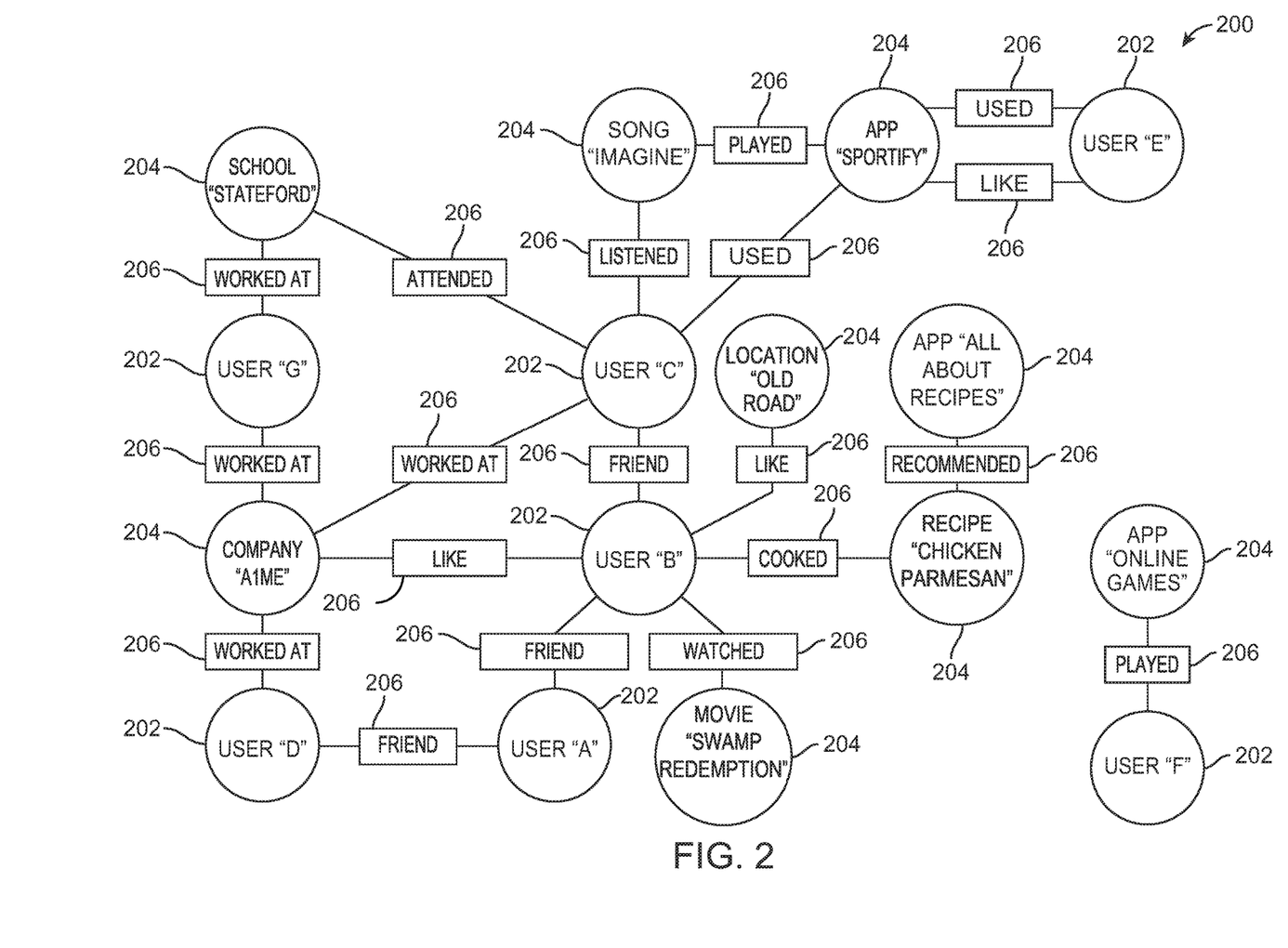
FIG. 2 illustrates an example social graph.

In particular embodiments, social-networking system 160 may store one or more social graphs (e.g., social graph 200) in one or more data stores 164. In particular embodiments, a social graph may include multiple nodes—which may include multiple user nodes (each corresponding to a particular user 101) or multiple concept nodes (each corresponding to a particular concept)—and multiple edges connecting the nodes. Social-networking system 160 may provide users 101 of the online social network the ability to communicate and interact with other users 101. In particular embodiments, users 101 may join the online social network via social-networking system 160 and then add connections (e.g., relationships) to a number of other users 101 of social-networking system 160 to whom they want to be connected. Herein, the term "friend" may refer to any other user 101 of social-networking system 160 with whom a user 101 has formed a connection, association, or relationship via social-networking system 160.

In particular embodiments, social-networking system 160 may provide users 101 with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

FIG. 2 illustrates an example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request"

to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 3:
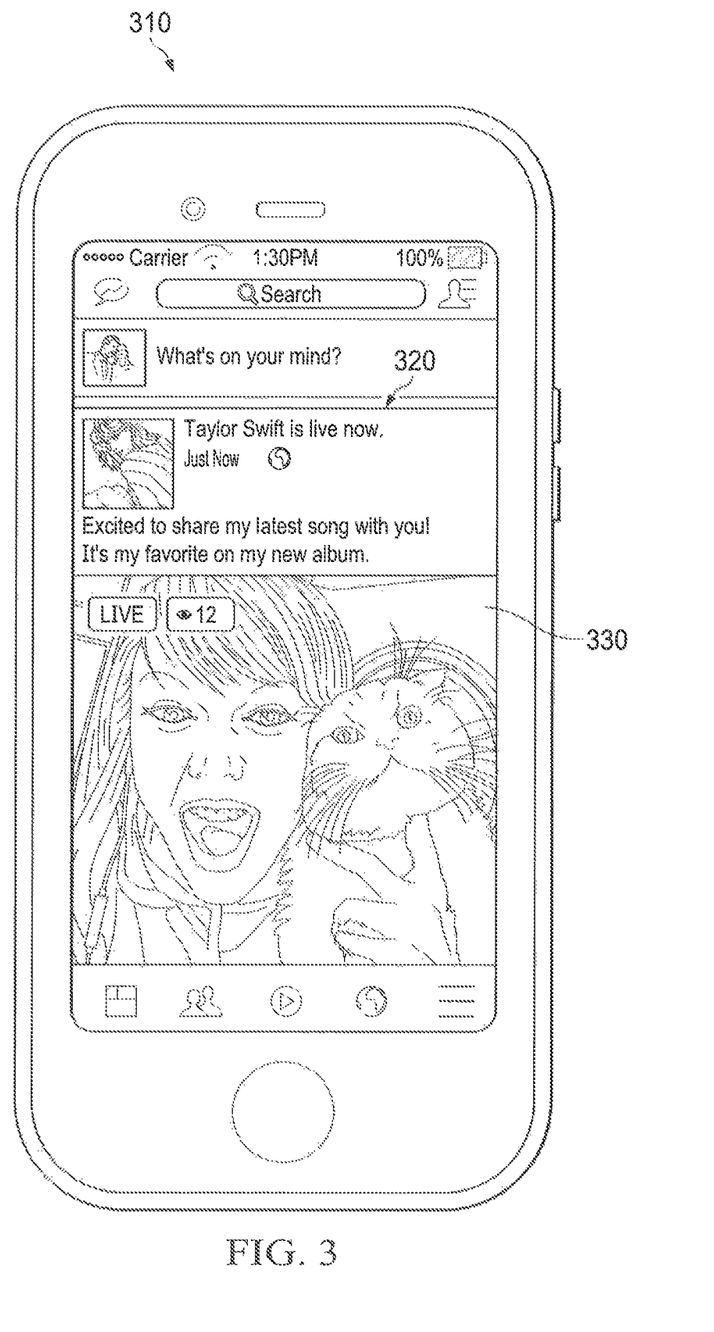
FIG. 3 illustrates an interface for selecting live videos to view.

FIG. 3 illustrates an interface 310 for selecting live videos to view. Interface 310 may be displayed to user 101 using any appropriate client system 130. For example, interface 310 may be displayed in a mobile application running on a smartphone 130. Interface 310 may include a newsfeed with various posts 320 that may notify user 101 when a live video is available. In general, post 320 is any post or notification that may be displayed to users 101 (e.g., in their timelines) at or after the start time of a live video. Post 320 may include an image 330 that, once selected, may cause the live video to begin playing in place of image 330, in a full screen on client system 130, or in a separate interface (e.g., live video interface 410 in FIG. 4) on any appropriate display device.

As used herein, a "live video" may refer to a video stream or any other form of multimedia that is transmitted over a network such as the Internet in real time or in near real time. For example, rather than wait for the entire video to arrive before making it available to other users 101, a computing system of social networking system 160 (e.g., server 162) may continuously receive/capture the received live video stream from client system 130 and immediately broadcast it to other users 101 of social networking system 160. In some embodiments, client system 130 may capture the live video stream by using a video camera, microphone, speaker, or any other mechanism to record video and/or audio. In certain embodiments, a video stream may comprise a video component, an audio component, or both a video and audio component. Multiple other users 101 of social networking system 160 may simultaneously view the live video using, for example, a mobile application or website of social networking system 160. For example, other users 101 who are connected to a particular user 101 in social graph 200 (e.g., users 101 who have previously followed or "liked" the particular 101) may be able to view the live video posted by the particular user 101.

Figure 4:
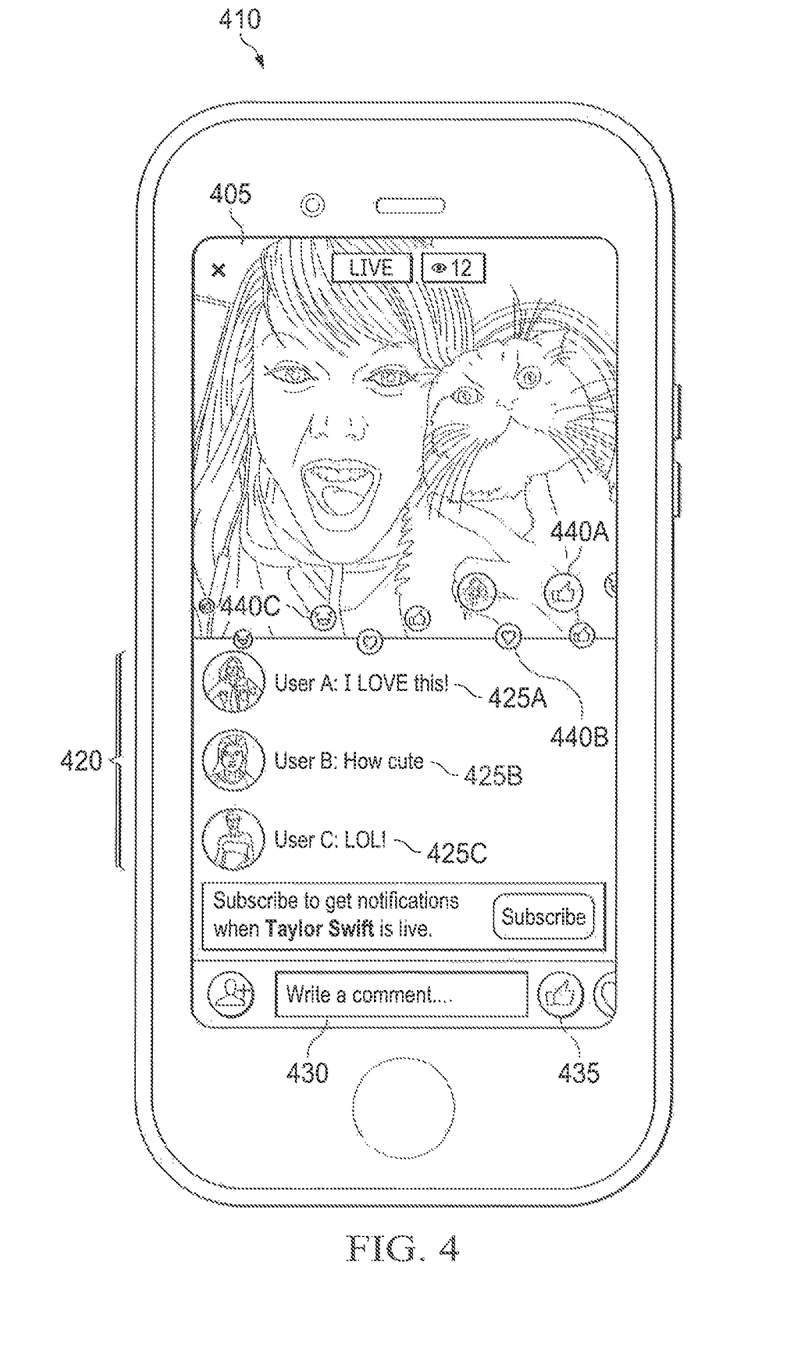
FIG. 4 illustrates an interface for viewing a live video and comments posted about the live video.

FIG. 4 illustrates a live video interface 410 that may be displayed to users 101 in order to view alive video 405. In some embodiments, live video interface 410 is displayed to the broadcaster (e.g., Taylor Swift) and/or to viewers 101 of the live video 405. In some embodiments, live video interface 410 may include a comment area 420 that displays one or more comments 425 (e.g., 425A-C) about live video 405 (e.g., from social graph 200) and a comment entry area 430 that permits user 101 to enter and post a comment 425 about live video 405. As discussed in more detail below with respect to FIG. 5, comments 425 may be automatically generated and posted to social-networking system 160 using speech, sentiment, reactions, and/or gestures of user 101. In other words, comments 425 about live video 405 may be automatically generated and posted to social-networking system 160 without user 101 having to type their comments into comment entry area 430. As a result, interactions between users 101 who are viewing live video 405 may be increased without requiring users 101 to look away or cease paying attention to live video 405 in order to type their comments to the live video.

In certain embodiments, live video interface 410 may be completely filled with live video 405 (i.e., a full-screen live video) either automatically (e.g., when client system 130 is rotated to a certain orientation) or when a selectable element within live video interfaces 410 is selected. In embodiments with a full-screen live video 405, comment area 430 may be initially hid from view, but may be forced to reappear using a sliding touch motion or any other appropriate option within live video interface 410. In some embodiments, comments 425 may be overlaid or may float across a full-screen live video 405.

Some embodiments of live video interface 410 may display reaction elements 440 (e.g., 440A-C). Reaction elements 440 are any appropriate graphical elements such as icons, badges, pictures, and the like. In some embodiments, reaction elements 440 may float across live video 405 (e.g., from right to left) as various users 101 who are watching live video 405 react to live video 405. In some embodiments, reaction elements 440 may correspond to selectable reaction buttons 435 that are selected by users 101. For example, when a particular user 101 selects a particular reaction button 435 in live video interface 410 or a mobile application running on client system 130 (e.g., proximate to image 330 in post 320), a reaction element 440 corresponding to the selected reaction button 435 may appear overlaid on top of live video 405 as illustrated in FIG. 4 (or in any other appropriate location within live video interface 410). In other embodiments, as discussed in more detail below, reaction elements 440 may be automatically generated in response to detected sentiments or verbal reactions of users 101 who are viewing live video 405. For example, if user 101 laughs during live video 405, a reaction element 440C that indicates that user 101 thinks live video 405 is funny may appear in live video 405. Reactions elements 440 may include any appropriate reaction of user 101 such as: a reaction that indicates that user 101 likes live video 405 (i.e., reaction element 440A); a reaction that indicates that user 101 loves live video 405 (i.e., reaction element 440B); a reaction that indicates that user 101 thinks live video 405 is funny (i.e., reaction element 440C); a reaction that indicates that user 101 is wowed by live video 405; a reaction that indicates that user 101 is saddened by live video 405; and a reaction that indicates that user 101 is angered by live video 405. While specific reaction elements 440 have been disclosed, other reaction elements 440 may be available.

Figure 5:
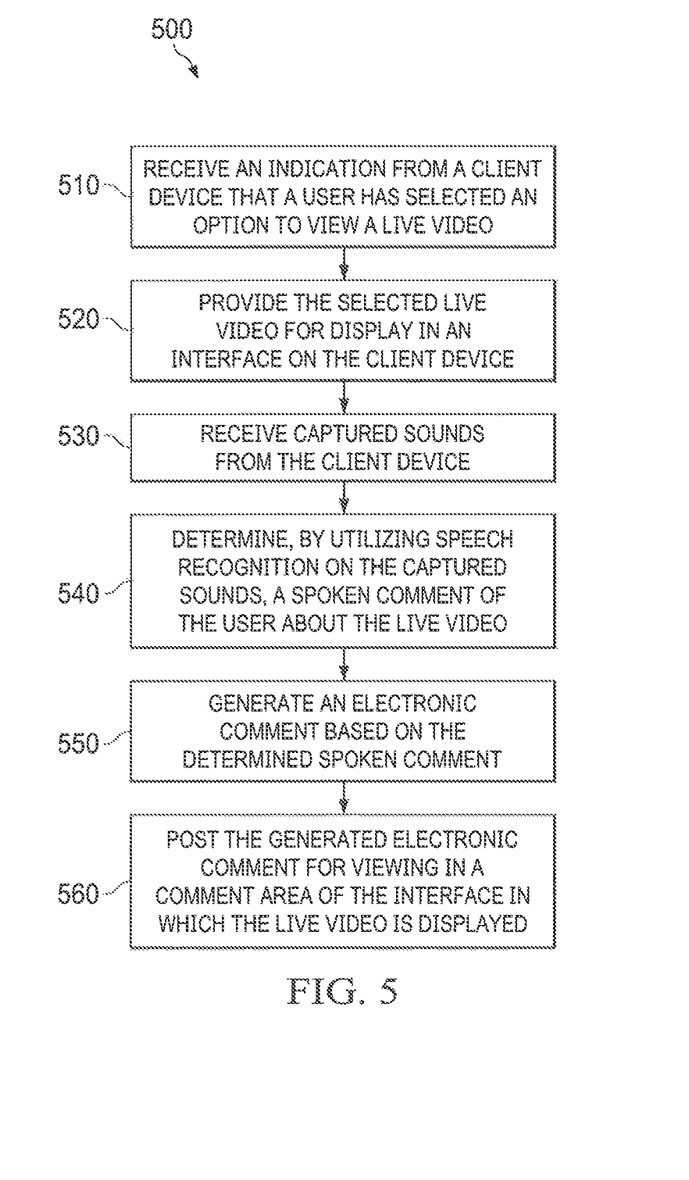
FIG. 5 illustrates an example method for automatically generating and posting comments and reactions to a live video using speech recognition.

FIG. 5 illustrates an example method 500 for automatically generating and posting comments and reactions to a live video using speech recognition. One or more steps of method 500 may be performed by client system 130 (e.g., a mobile application running on client system 130) or one or more systems of social networking system 160 (e.g., server 162). Method 500 may begin in step 510 where an indication is received from a client device that a user has selected an option to view a live video. In some embodiments, the client device is client system 130 and the live video is live video 405. In some embodiments, the user selects an image (e.g., image 330) or video within a mobile application in order to view the live video. For example, the user may select an image within a post of a personalized newsfeed on their smartphone or other client device.

In step 520, the selected live video is provided for display in an interface on the client device. In some embodiments, the interface is live video interface 410. In some embodiments, the interface includes a comment area such as comment area 420 that displays comments that are posted about the live video by users who are viewing the live video. In some embodiments, the interface includes reactions such as reaction elements 440. In some embodiments, the comments and reactions may appear over the live video (e.g., floating across the live video) as they are posted. In some embodiments, the comments and reactions are determined using a social graph such as social graph 200.

In step 530, captured sounds are received from the client device. In some embodiments, the sounds are captured and received from one or more microphones of the client device. The captured sounds include sounds of the environment while the user is watching the live video of step 520. For example, within a predetermined amount of time after the live video begins playing (e.g., within one second), the microphone of the client device may begin capturing the environmental sounds. The captured sounds may be stored within the client device and/or sent to another computing system such as server 162 for processing.

In step 540, method 500 determines, by utilizing speech recognition on the captured sounds of step 530, a spoken comment of the user about the live video. For example, an ASR algorithm may be used to determine from the captured environmental sounds of step 530 that User A who is viewing the live video said "I love this." As another example, the ASR algorithm may be used to determine from the captured environmental sounds of step 530 that User B who is viewing the live video said "how cute."

In some embodiments, step 540 may utilize any appropriate signal or data to aid with determining spoken comments of users while they are watching the live video. Such signals and data may include, for example: one or more images of the live video, a category of the live video, closed captioning data of the live video, comments from other users who are viewing the live video, and the like. Signals and data such as these may be used by the ASR algorithm to narrow the possibilities and pinpoint what a user is saying. This may be especially useful on language challenges such as homonyms (i.e., words that sound alike but have different meanings). For example, consider a scenario where the ASR algorithm determines that a user either said the word "eight" or "ate." To determine which one of these words is the correct word spoken the user, method 500 may analyze images from the live video, other comments from other users posted about the live video, and/or a category of the live video to determine that the live video is related to cooking. Using this information, method 500 may then determine that the correct word spoken by the user was "ate."

In some embodiments, step 540 may utilize a deep-learning model to generate a plurality of predictions for a plurality of concepts for one or more images of the live video, as described in U.S. patent application Ser. No. 15/394,289, titled "Updating Predictions for a Deep-Learning Model," filed 29 Dec. 2016, and U.S. patent application Ser. No. 15/393,773, titled "Adding Concepts to a Deep-Learning Model in Real Time," filed 29 Dec. 2016, which are each entirely incorporated by reference herein. The predicted concepts for the images of the live video may then be used to aid with determining spoken comments of users while they are watching the live video. Using the above scenario where the ASR algorithm determines that a user either said the word "eight" or "ate," the deep-learning model may be used to generate a predicted concept of "cooking" for one or more images of the live video. This predicted concept of "cooking" may then be used to determine that the correct word spoken the user was "ate."

In step 550, method 500 generates an electronic comment based on the determined spoken comment of step 540. For example, if it is determined in step 540 that User A who is viewing the live video said "I love this," an electronic comment such as comment 425A of "I LOVE this!" may be generated. In some embodiments, the generated comment may be stored in social graph 200 with an edge connection to a node of User A and a node of the live video.

In some embodiments, step 550 may additionally include determining, from the captured sounds, a sentiment of the spoken comment of the user about the live video. For example, method 500 may determine that User A was excited when they said "I love this" since they raised the volume of their voice or tone while speaking the comment. In some embodiments, the determined sentiment may be used to format a visual aspect of the electronic comment generated in step 500. For example, the determined sentiment may be used to format the electronic comment with a specific background color, font, size of text, text color, text emphasis (e.g., bold text, underlined text, italic text, etc.), text capitalization, and the like. As a specific example, if one or more words of the comment are said with increased enthusiasm (e.g., raised volume or tone with respect to a normalized volume or tone for the user), one or more words of the generated electronic comment may be in all capital letters, may be in bold text, may include one or more exclamation marks, or any other appropriate visual appearance to project a happy or excited sentiment. In the example of FIG. 4, User A used a raised or excited tone for the word "love" and therefore the generated comment 425A used all capital letters for that word and an exclamation mark at the end of the comment (i.e., "I LOVE this!"). As another example, if the comment was said with decreased enthusiasm (e.g., lowered volume or tone with respect to a normalized volume or tone for the user), the generated electronic comment may be in a decreased font, may be in all lower case letters, or any other appropriate visual appearance to project a sad or depressed sentiment.

In some embodiments, step 550 may additionally include determining, from the captured sounds, a reaction of the user to the live video. For example, method 500 may determine that User A laughed, gasped, or cried during part of the live video. In response, method 500 may post a reaction element to the live video based on the determined reaction of the user. In some embodiments, the reaction element may be reaction element 440. For example, if the user laughed during the live video, a reaction element 440C that indicates the user thinks the live video is funny may be displayed with the live video. In some embodiments, method 500 may additionally or alternatively post a reaction element to the live video based on spoken comments by the user. For example, if the user says "I love this," a reaction element 440B that that indicates that the user loves the live video may be displayed along with the live video.

In some embodiments, method 500 may additionally include determining, from one or more images or videos captured by the user's client device, a gesture of the user about the live video. For example, a camera of a smartphone 130 or a smart TV 130 of the user may capture one or more images or video of the user while they are watching the live video. Any appropriate gesture algorithm may then be utilized to determine and interpret one or more gestures of the user. For example, method 500 may determine that the user made an "OK" gesture with their hand. As another example, method 500 may determine that the user was smiling or frowning while watching the live video. Method 500 may then post one or more reaction elements or comments to the live video based on the determined gesture of the user. For example, in response to determining that the user made an "OK" gesture with their hand, method 500 may post an electronic comment of "OK" to the live video. As another example, in response to determining that the user was smiling while watching the live video, method 500 may post an electronic comment of ":)" or a reaction element 440 such as 440C to the live video. As yet another example, in response to determining that the user made a thumbs-up gesture with their hand, method 500 may post a reaction element 440 such as 440A to the live video.

In some embodiments, one or more visual aspects of an electronic comment generated in step 550 may be formatted based on a determined gesture of the user. For example, if it is determined from facial gestures that the user is enthusiastic or passionate while making a comment (e.g., increased facial gestures from a baseline level for a specific user), one or more words of the generated electronic comment may be in all capital letters, may be in bold text, may include one or more exclamation marks, or any other appropriate visual appearance to project an excited sentiment.

In step 560, method 500 posts the generated electronic comment for viewing in a comment area of the interface in which the live video is displayed. In some embodiments, friends or other connections of User A may view the generated comment in an interface such as live video interface 410 as they are viewing the live video. In other embodiments, all users who are viewing the live video may view the generated comment in an interface such as live video interface 410 as they are viewing the live video.

In some embodiments, step 560 of method 500 may additionally include filtering comments that are generated and displayed along with the live video. For example, method 500 may find the most useful or relevant comments made by each particular user and only post those comments for viewing along with the live video. In other words, step 560 may filter out unwanted or unrelated spoken comments by the user before they are posted for viewing along with the live video. As a specific example, step 540 may determine that the user said "I love this live video" and "ouch, that bee stung me." Using any of the signals or data described above, step 560 may determine that only the first spoken comment of "I love this live video" is relevant to the live video and therefore may filter out the second spoken comment of "ouch, that bee stung me." As a result, irrelevant and unwanted comments may be prevented from appearing along with the live video.

In some embodiments, method 500 may additionally include clustering comments based on predetermined time periods. For example, instead of analyzing every spoken comment by a user during the entire live video, some embodiments may instead wait for a specific time period to pass (e.g., one minute, five minutes, etc.) and then analyze comments spoken during that time period. In some embodiments, step 540 may utilize such clustering techniques to determine spoken comments by the user about the live video. In some embodiments, step 550 may utilize such clustering techniques in generating electronic comments. In some embodiments, step 560 may utilize such clustering techniques in filtering and/or posting generated comments for display along with the live video.

Some embodiments may include various privacy features to allow users to control how generated comments are posted for viewing along with the live video. For example, users may be presented with an interface with one or more options to control which other users may see generated comments. These options may include, for example, an option for only friends to see the generated comments, an option for only the user's connections to see the generated comments, and an option for all users to see the generated comments. In some embodiments, the user may also be presented with options to pre-approve generated comments before they are posted for viewing. For example, users may choose between automatically generating and posting comments to the live video without any further approval or to request approval from the user for any generated comments before they are posted. In the latter case, electronic comments that are generated may be displayed in live video interface 410 with options to approve or delete the comments before they are posted. In some embodiments, users may be able to edit generated comments before they are posted (e.g., for content, visual appearance, etc.). In some embodiments, users may be presented with options to retract, edit, or delete any comments after they have been posted to a live video. For example, if a user approves or pre-approves an electronic comment for posting to a live video, selectable options may be presented along with the comment that allows the users to retract, edit, or delete the comment after it has been posted.

In some embodiments, one or more accessibility features may be included to assist with automatically posting comments to a live video. As one example, a camera of the user's smartphone 130 may be used to capture video of the user as they are watching a live video. A sign language detection algorithm may then be used to analyze the video and then generate comments based on the detected sign language. As a result, users with disabilities may be able to easily and efficiently post comments to a live video they are watching.

In some embodiments, spoken comments may be translated to a different language before they are posted to a live video. For example, if a live video is being broadcast by User A, social-networking system 160 may analyze social graph 200 to determine that User A speaks a particular language and then translate comments to the particular language before they are posted to the live video. For example, social-networking system 160 may analyze the language used in User A' prior posts and/or analyze where the user resides in order to determine a particular language associated with the user. Comments posted to the user's live video may then be translated before they are posted to the live video. For example, if it is determined that User A predominately speaks English, comments posted to User A's live videos may be translated into English from other languages before they are posted to the live videos.

In some embodiments, a selectable option may be presented along with the live video that permits users to begin automatically generating and posting comments to the live video. For example, live video interface 410 may include a selectable GUI element (e.g., picture, button, etc.) that enables automatic generation and posting of comments. Users who are watching a particular live video may select the GUI element to begin automatically generating and posting comments to the live video. In some embodiments, the GUI element may be selected a second time to stop automatically generating and posting comments to the live video.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for automatically generating and posting comments and reactions to a live video including the particular steps of the method of FIG. 5, this disclosure contemplates any suitable method for automatically generating and posting comments and reactions to a live video including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
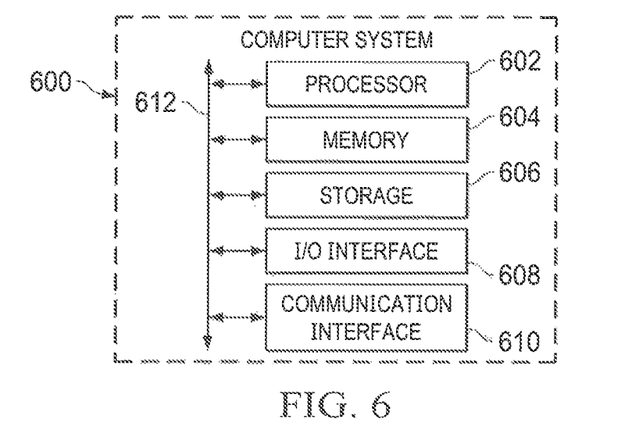
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computing devices, receiving an indication from a client device that a user has selected an option to view a live video;
   by the one or more computing devices, providing the live video for display in an interface on the client device;
   by the one or more computing devices, receiving captured sounds from the client device, the captured sounds comprising environmental sounds captured by a microphone of the client device while the user is watching the live video;
   by the one or more computing devices, determining, by utilizing speech recognition on the captured sounds, a spoken comment of the user about the live video and another spoken comment of the user not relevant to the live video;
   by the one or more computing devices, generating an electronic comment based on the determined spoken comment and filtering the determined another spoken comment so as to prevent generation of an electronic comment based on the determined another spoken comment of the user not relevant to the live video;
   by the one or more computing devices, determining, from the captured sounds, a sentiment of the spoken comment of the user about the live video;
   by the one or more computing devices, formatting the generated electronic comment to have a different visual appearance based on the determined sentiment; and
   by the one or more computing devices, posting the formatted electronic comment for viewing in a comment area of the interface in which the live video is displayed.

2. The method of claim 1, wherein formatting the generated electronic comment comprises changing one or more of:
   a background color;
   a font;
   a size of text;
   a text color;
   a text emphasis comprising one or more of bold text, underlined text, and italic text; and
   a text capitalization.

3. The method of claim 1, further comprising:
   by the one or more computing devices, determining, from the captured sounds, a reaction of the user to the live video; and
   by the one or more computing devices, posting a reaction element to the live video based on the determined reaction of the user.

4. The method of claim 3, wherein the reaction element comprises one of:
- a reaction element that indicates the user likes the live video;
- a reaction element that indicates the user loves the live video;
- a reaction element that indicates the user thinks the live video is funny;
- a reaction element that indicates the user is wowed by the live video;
- a reaction element that indicates the user is saddened by the live video; and
- a reaction element that indicates the user is angered by the live video.

5. The method of claim 1, further comprising:
- by the one or more computing devices, determining, from an image or video captured by the client device, a gesture of the user about the live video; and
- by the one or more computing devices, posting a reaction element to the live video based on the determined gesture of the user, the reaction element comprising one of:
  - a reaction element that indicates the user likes the live video;
  - a reaction element that indicates the user loves the live video;
  - a reaction element that indicates the user thinks the live video is funny;
  - a reaction element that indicates the user is wowed by the live video;
  - a reaction element that indicates the user is saddened by the live video; and
  - a reaction element that indicates the user is angered by the live video.

6. The method of claim 1, further comprising:
- by the one or more computing devices, determining, from an image or video captured by the client device, a gesture of the user about the live video; and
- by the one or more computing devices, formatting the generated electronic comment based on the determined gesture of the user, the formatting of the generated electronic comment comprising changing one or more of:
  - a background color;
  - a font;
  - a size of text;
  - a text color;
  - a text emphasis comprising one or more of bold text, underlined text, and italic text; and
  - a text capitalization.

7. One or more computer-readable non-transitory storage media embodying software that is operable when executed to:
- access sounds captured by a client device of a user, the captured sounds comprising environmental sounds captured by a microphone of the client device while the user is watching a live video;
- determine, by utilizing speech recognition on the captured sounds, a spoken comment of the user about the live video and another spoken comment of the user not relevant to the live video;
- generate an electronic comment based on the determined spoken comment;
- filter the determined another spoken comment so as to prevent generation of an electronic comment based on the determined another spoken comment of the user not relevant to the live video;
- determine, from the captured sounds, a sentiment of the spoken comment of the user about the live video;
- format the generated electronic comment to have a different visual appearance based on the determined sentiment; and
- post the formatted electronic comment for viewing in a comment area of an interface in which the live video is displayed.

8. The media of claim 7, wherein formatting the generated electronic comment comprises changing one or more of:
- a background color;
- a font;
- a size of text;
- a text color;
- a text emphasis comprising one or more of bold text, underlined text, and italic text; and
- a text capitalization.

9. The media of claim 7, the software further operable when executed to:
- determine, from the captured sounds, a reaction of the user to the live video; and
- post a reaction element to the live video based on the determined reaction of the user.

10. The media of claim 9, wherein the reaction element comprises one of:
- a reaction element that indicates the user likes the live video;
- a reaction element that indicates the user loves the live video;
- a reaction element that indicates the user thinks the live video is funny;
- a reaction element that indicates the user is wowed by the live video;
- a reaction element that indicates the user is saddened by the live video; and
- a reaction element that indicates the user is angered by the live video.

11. The media of claim 7, the software further operable when executed to:
- determine, from an image or video captured by the client device, a gesture of the user about the live video; and
- post a reaction element to the live video based on the determined gesture of the user, the reaction element comprising one of:
  - a reaction element that indicates the user likes the live video;
  - a reaction element that indicates the user loves the live video;
  - a reaction element that indicates the user thinks the live video is funny;
  - a reaction element that indicates the user is wowed by the live video;
  - a reaction element that indicates the user is saddened by the live video; and
  - a reaction element that indicates the user is angered by the live video.

12. The media of claim 7, the software further operable when executed to:
- determine, from an image or video captured by the client device, a gesture of the user about the live video; and
- format the generated electronic comment based on the determined gesture of the user, the formatting of the generated electronic comment comprising changing one or more of:
  - a background color;
  - a font;
  - a size of text;

a text color;
a text emphasis comprising one or more of bold text, underlined text, and italic text; and
a text capitalization.

13. A system comprising:
a microphone;
one or more processors; and
a memory coupled to the processors, the memory comprising instructions executable by the one or more processors, the one or more processors being operable when executing the instructions to:
access environmental sounds captured by the microphone while the user is watching a live video;
determine, by analyzing the captured sounds, a spoken comment of the user about the live video and another spoken comment of the user not relevant to the live video;
generate a comment or a reaction element based on the determined spoken comment of the user about the live video;
filter the determined another spoken comment so as to prevent generation of an electronic comment based on the determined another spoken comment of the user not relevant to the live video;
determine, from the captured sounds, a sentiment of the spoken comment of the user about the live video;
format the generated comment or reaction element to have a different visual appearance based on the determined sentiment; and
post the generated comment or reaction element for display along with the live video.

14. The system of claim 13, wherein formatting the generated comment or reaction element comprises changing one or more of:
a background color of the generated comment;
a font of text within the generated comment;
a size of text within the generated comment;
a text color of the generated comment;
a text emphasis comprising one or more of bold text, underlined text, and italic text of the generated comment;
a text capitalization of the generated comment;
a size of the reaction element; and
a color or shading of the reaction element.

15. The system of claim 13, wherein the reaction element comprises one of:
a reaction element that indicates the user likes the live video;
a reaction element that indicates the user loves the live video;
a reaction element that indicates the user thinks the live video is funny;
a reaction element that indicates the user is wowed by the live video;
a reaction element that indicates the user is saddened by the live video; and
a reaction element that indicates the user is angered by the live video.

16. The system of claim 13, the one or more processors further operable when executing the instructions to:
determine, from an image or video captured by the client device, a gesture of the user about the live video, wherein the generated comment or reaction element is further based on the determined gesture.

17. The system of claim 16, wherein the gesture of the user comprises one or more of:
a facial expression; and
a hand gesture.

18. The method of claim 1,
wherein generating the electronic comment based on the determined spoken comment and determining, from the captured sounds, the sentiment of the spoken comment of the user about the live video are performed in a predetermined order, and
wherein determining, from the captured sounds, the sentiment of the spoken comment of the user about the live video and formatting the generated electronic comment to have the different visual appearance based on the determined sentiment are performed in another predetermined order.

19. The media of claim 7, the software further operable when executed to:
generate the electronic comment based on the determined spoken comment and determine from the captured sounds, the sentiment of the spoken comment of the user about the live video in a predetermined order; and
determine, from the captured sounds, the sentiment of the spoken comment of the user about the live video and format the generated electronic comment to have the different visual appearance based on the determined sentiment in another predetermined order.

20. The system of claim 13, the one or more processors being operable when executing instructions to:
generate the comment based on the determined spoken comment and determine, from the captured sounds, the sentiment of the spoken comment of the user about the live video in a predetermined order; and
determine from the captured sounds, the sentiment of the spoken comment of the user about the live video and format the comment to have the different visual appearance based on the determined sentiment in another predetermined order.

* * * * *